US011172020B2

(12) United States Patent
Vulgarakis Feljan et al.

(10) Patent No.: US 11,172,020 B2
(45) Date of Patent: Nov. 9, 2021

(54) METHOD AND COMMUNICATION DEVICE FOR DETERMINING A SCORE RELATING TO A FIRST AGENT MODULE

(71) Applicant: Telefonaktiebolaget LM Ericsson (publ), Stockholm (SE)

(72) Inventors: Aneta Vulgarakis Feljan, Stockholm (SE); Chunyan Fu, Pointe-Claire (CA); Klaus Raizer, Indaiatuba (BR); Ramamurthy Badrinath, Bangalore (IN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/629,933

(22) PCT Filed: Jul. 14, 2017

(86) PCT No.: PCT/SE2017/050783
§ 371 (c)(1),
(2) Date: Jan. 9, 2020

(87) PCT Pub. No.: WO2019/013680
PCT Pub. Date: Jan. 17, 2019

(65) Prior Publication Data
US 2020/0137152 A1    Apr. 30, 2020

(51) Int. Cl.
*G06F 15/16* (2006.01)
*H04L 29/08* (2006.01)

(52) U.S. Cl.
CPC ............... *H04L 67/1057* (2013.01)

(58) Field of Classification Search
CPC .......... H04L 67/1044; H04L 67/1057; H04W 12/37; H04W 12/55; H04W 12/66; H04W 24/02; H04W 4/21

(Continued)

(56) References Cited

U.S. PATENT DOCUMENTS 7,630,986 B1 * 12/2009 Herz ................. G06Q 10/10
9,338,597 B2 * 5/2016 Abu-Hakima ........ H04W 4/90

(Continued)

FOREIGN PATENT DOCUMENTS

EP    3179420 A1 *  6/2017  ......... G06F 16/2465
EP    3179420 A1     6/2017

OTHER PUBLICATIONS

International Search Report and Written Opinion for Application No. PCT/SE2017/050783, dated May 18, 2018, 14 pages.

(Continued)

*Primary Examiner* — Moustafa M Meky
*Assistant Examiner* — Thorne E Waugh
(74) *Attorney, Agent, or Firm* — Nicholson De Vos Webster & Elliott LLP

(57) ABSTRACT

A method and a communication device for determining a score relating to a first agent module are described. The communication device receives information relating to at least one request, performed by another agent module separate from the first agent module, for consumption of a capability of the first agent module. The information relating to the at least one request includes information about the capability of the first agent module, information about an intention of the first agent module, and information about a policy for the capability. The communication device calculates the score in relation to the first agent module based on the information relating to the at least one request, wherein the score further is specified with respect to the capability.

18 Claims, 4 Drawing Sheets

(58) Field of Classification Search
USPC .......................................................... 709/226
See application file for complete search history.

(56) References Cited

U.S. PATENT DOCUMENTS

| | | | | |
|---|---|---|---|---|
| 9,654,955 | B2* | 5/2017 | Fletcher | H04L 67/303 |
| 10,278,049 | B2* | 4/2019 | Abu-Hakima | H04L 63/0428 |
| 10,311,856 | B2* | 6/2019 | Nygaard | G10L 15/26 |
| 10,521,566 | B2* | 12/2019 | Choi | H04L 63/10 |
| 10,747,183 | B2* | 8/2020 | Sinha | G05B 13/0205 |
| 2013/0097664 | A1* | 4/2013 | Herz | G06Q 10/10 |
| | | | | 726/1 |
| 2015/0363431 | A1* | 12/2015 | Fox | H04L 67/141 |
| | | | | 707/748 |
| 2016/0094411 | A1* | 3/2016 | Brennan | H04L 41/046 |
| | | | | 709/224 |
| 2017/0150373 | A1 | 5/2017 | Brennan et al. | |
| 2017/0168480 | A1 | 6/2017 | Wanstedt et al. | |

OTHER PUBLICATIONS

Aboulwafa S. et al., "DiReCT: Dirichlet-based Reputation and Credential Trust Management." 2010 The 7th International Conference on Informatics and Systems (INFOS), Mar. 28, 2010, pp. 1-8.
Choi H.-S. et al., "Trusted Cross-Domain Metadata Model for Context Aware Services," 2017 Ninth International Conference on Ubiquitous and Future Networks (ICUFN), Jul. 4, 2017, pp. 338-343.
Dladlu N. et al., "Implementation of a Novel Peer-to-Peer Reputation-Based Trust Management Model in a Cloud Service Provisioning Environment," The International Conference on Digital Information Processing, E-Business and Cloud Computing (DIPECC2013), Oct. 23-25, 2013 [retrieved on May 8, 2018], Retrieved from the internet, pp. 210-217.
Borenstein N. et al., "An Architecture for Reputation Reporting," Internet Engineering Task Force (IETF), RFC 7070, Category: Standards Track, ISSN: 2070-1721, Nov. 2013, pp. 1-16.
Di Martino B. et al., "Towards an Ontology-Based Intercloud Resource Catalogue—The IEEE P2302 Intercloud Approach for a Semantic Resource Exchange," 2015 IEEE International Conference on Cloud Engineering, Mar. 9-13, 2015, pp. 458-464.
Rishwaraj G. et al., "Heuristics-Based Trust Estimation in Multiagent Systems Using Temporal Difference Learning," IEEE Transactions on Cybernetics vol. 47, No. 8, Dec. 20, 2016, 1925-1935.
Wang S.I. et al., "Learning Language Games through Interaction," Proceedings of the 54th Annual Meeting of the Association for Computational Linguistics, ArXiv abs/1606.02447, Aug. 2016, pp. 1-11.
Yu H. et al. "A Survey of Multi-Agent Trust Management Systems," IEEE Access, vol. 1, May 10, 2013, pp. 35-50.
European Search Report and Search Opinion, EP App. No. 17917346.3, dated Oct. 30, 2020, 11 pages.
International Preliminary Report on Patentability, PCT App. No. PCT/SE2017/050783, dated Jan. 23, 2020, 11 pages.

* cited by examiner

METHOD AND COMMUNICATION DEVICE FOR DETERMINING A SCORE RELATING TO A FIRST AGENT MODULE

CROSS-REFERENCE TO RELATED APPLICATIONS

This application is a National stage of International Application No. PCT/SE2017/050783, filed Jul. 14, 2017, which is hereby incorporated by reference.

TECHNICAL FIELD

Embodiments herein relate to communication systems, such as wireless or wired system which may host one or more agent communities. In particular, a method and a communication device for determining a score relating to a first agent module are disclosed. A corresponding computer program and a computer program carrier are also disclosed.

BACKGROUND

Communication systems may commonly include one or more agents. In this context, an agent is a software component that executes on some hardware, such as a stand-alone computing device, a cellular phone, a cloud system or the like.

In a known multi-agent system, a plurality of agents is connected to each other through a network. Due to a complex nature of tasks and environments that the agents are operational in, one or more agents may have limited resources to accomplish what they are capable of. The resource can be limited since the agents share for example data, network bandwidth, computing capacity and the like. For an agent, in such multi-agent system, it is a challenging task to find capable and reliable peer agents to interact with. The multi-agent system may be a multi-agent network, a network of Internet of Things (IoT) devices, a hybrid network of IoT devices and one or more edge cloud resource managers, hybrid network of devices and humans represented with a digital twin etc. There exist various trust and reputation mechanisms that handle how to find an agent having a certain capability and fulfilling a certain need for trust, or reliability. The diversity of the plurality of agents in the multi-agent system makes it very challenging and complex to address this issue. Moreover, complexity of interactions between the plurality of agents further complicates matters relating to this issue.

Trust can be defined as an attitude, or willingness, that an agent will help achieve goals of another agent in any situation. Possibly, the agent can be in a situation that is characterized by uncertainty and vulnerability.

The known multi-agent system may be realized in the form of a set of mobile agents and an edge cloud agent. The edge cloud agent can have limited resources, but can offer a service for computation and aggregation of data coming from the mobile agents. The mobile agents can be cellular devices, such as cellular phones, user equipments, portable devices, robots or the like, which execute respective software agents. The edge cloud agent can be a radio base station, such as an evolved-NodeB, radio network controller, radio network node or the like, which execute a software agent. Some of the mobile agents may not be trusted. With existing trust and reputation mechanisms, it may be difficult to find out which mobile agent to trust or not due to insufficient accuracy.

An example relating to a robotic multi-agent system, including a plurality of interconnected robots, could be as follows: a painting robot may be capable of painting and moving in a certain manner. A packaging robot can lift packages, put them in boxes and close the boxes. With existing trust and reputation mechanisms, it may be difficult to find out which robot to trust or not due to insufficient accuracy. For example, it may difficult to judge whether or not a certain robot is in fact trusted for performing some actions, but not for other. For instance, it might show that some of the packaging robots are trusted when it comes to lifting packages, but not when it comes to closing boxes.

Request For Comments (RFC) 7070, Internet Engineering Task Force (IETF), suggest an architecture for publish/subscribe reputation (rating) reporting about a variety of applications on the Internet. In this document, mutually trusted parties exchange assessment information about other actors, such as web sites, quality of service of an Internet Service Provider or the like. Reputation is defined as an estimation in which a person or a thing is held trustworthy by the community or the public in general. Reputations can be described for multiple attributes; an e-commerce site may be rated on price, speed of delivery, customer service, etc., and might receive different ratings on each. There is a Reputation Service that is queried to provide reputation about an entity. In the reputation response, there is information about a rating, an identity of the entity providing the reputation response, an entity being rated, an overall rating score of the entity, a level of confidence in that accuracy of the rating.

In the state of the art of multi-agent trust based cooperation, trust is usually calculated either as a function of previous interactions in simple terms such as success/failure rate, or agent reputation. In many scenarios, the trust is therefore not sufficiently accurate.

SUMMARY

An object may be to improve accuracy of a score for the agents, e.g. a trust level between two agents in a system of the abovementioned kind.

According to an aspect, the object is achieved by a method in a communication device for determining a score relating to a first agent module. The first agent module is included in an agent community managed by an agent community module. The communication device receives information relating to at least one request, performed by any further agent module, for consumption of a capability of the first agent module, wherein said any further agent module is included in the agent community. The information relating to the performed request includes information about the capability of the first agent module, information about an intention of the first agent module, wherein the intention specifies a set of actions that consumes the capability in order to fulfil the request, and information about a policy for the capability, wherein the policy restricts, in terms of one or more of time, space, speed and hardware used by the first agent module, consumption of the capability when the first agent module acts according to its intention in order to fulfil the request. Furthermore, the communication device calculates the score in relation to the first agent module based on the information relating to the performed request, wherein the score further is specified with respect to the capability.

According to another aspect, the object is achieved by a communication device configured for determining a score relating to a first agent module. The first agent module is included in an agent community managed by an agent community module. The communication device is further configured for receiving information relating to at least one request, performed by any further agent module, for consumption of a capability of the first agent module, wherein said any further agent module is included in the agent community. The information relating to the performed request includes information about the capability of the first agent module, information about an intention of the first agent module, wherein the intention specifies a set of actions that consumes the capability in order to fulfil the request, and information about a policy for the capability, wherein the policy restricts, in terms of one or more of time, space, speed and hardware used by the first agent module, consumption of the capability when the first agent module acts according to its intention in order to fulfil the request. Moreover, the communication device is configured for calculating the score in relation to the first agent module based on the information relating to the performed request, wherein the score further is specified with respect to the capability.

According to further aspects, the object is achieved by a computer program and a computer program carrier corresponding to the aspects above.

Thanks to that the information relating to the performed request further includes the information about the intention of the first agent module and the information about the policy for the capability, the communication device is able to calculate the score, e.g. a trust level, a trust score, a trust value, a value or the like, by taking into account a combination of three measures, i.e. information about the capability, the intention and the policy. For each capability of the first agent, the communication device may calculate a respective score. Hence, since also the intention and the policy is taken into account a more accurate score is obtained by the calculation performed by the communication device. As a result, the abovementioned object is achieved.

An advantage is agent may more accurately determine whether or not to trust a peer agent, e.g. by comparing the score to a threshold value.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
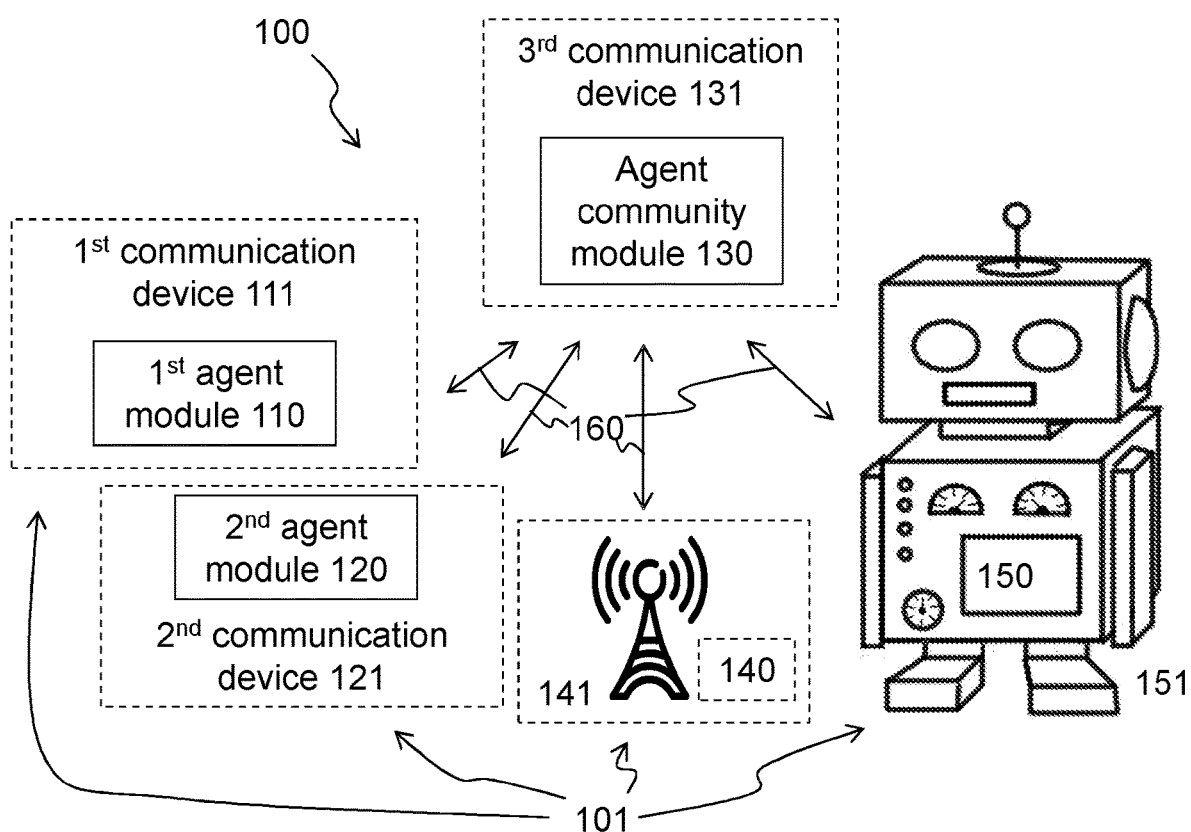
FIG. 1 is a schematic overview of an exemplifying system in which embodiments herein may be implemented.

Throughout the following description similar reference numerals have been used to denote similar features, such as nodes, actions, modules, circuits, parts, items, elements, units or the like, when applicable. In the Figures, features that appear in some embodiments are indicated by dashed lines.

FIG. 1 depicts an exemplifying system 100 in which embodiments herein may be implemented.

The system comprises a plurality of communication devices—to be presented in more detail in the subsequent paragraph—, which may be communicatively connected to each other by means of a Global System for Mobile communication (GSM) network. In other examples, the network 100 may be any cellular or wireless communication system, such as a Long Term Evolution (LTE), Universal Mobile Telecommunication System (UMTS) and Worldwide Interoperability for Microwave Access (WiMAX), a wired circuit switched system, a wired Internet Protocol (IP) network, a computer network or the like.

In more detail, the system 100 comprises a first communication device 111, which may comprise a first agent module 110. The system 100 also comprises a second communication device 121, which may comprise a second agent module 120. Furthermore, the system 100 comprises a third communication device 131, which may comprise a third agent module 130, as referred to as an agent community module 130. Additionally, the system 100 may comprise a fourth and a fifth communication device 141, 151, which may comprise a fourth and a fifth agent module 140, 150, respectively. The fourth and/or fifth agent module 140, 150 may be referred to as "any further agent module" herein.

Above an expression that can be generalized to "communication device comprising an agent module" may mean that the agent module is executed by, or on, the communication device, in case the agent module is realized as a software module. However, in other examples, the agent module may be realized as a hardware module, in which case the generalized expression may be understood to mean that the agent module is enclosed within the same casing, typically a plastic or metallic box, as the communication device.

The first, second and/or fourth communication device 111, 121, 141 and/or the first, second and/or fourth agent module 110, 120, 140 may communicate 160, wirelessly or by wired connection, with the third communication device 131 and/or the agent community module 130.

The agent modules above may have different capabilities. For example, the fifth agent module 150 may be a robot that is capable of lifting, moving and putting down items, such as boxes, products, construction elements for buildings etc. As a further example, the agent module 140 may be edge cloud service, which for example identifies objects in images provided to the edge cloud service. These agent modules 140, 150 are different. Therefore, the system 100 is said to include a collaborative network of heterogeneous agent modules, such as IoT devices, edge cloud agents, robots etc.

In the following description, the embodiments herein may be implemented in the second communication device 121. However, as shall be described, the embodiments may in some cases be implemented in the third communication device 131. Let's generally consider the case when the embodiments are implemented in the second communication device 121. The cases when the embodiments are implemented in the third communication device 131 will be mentioned explicitly below.

Figure 2:
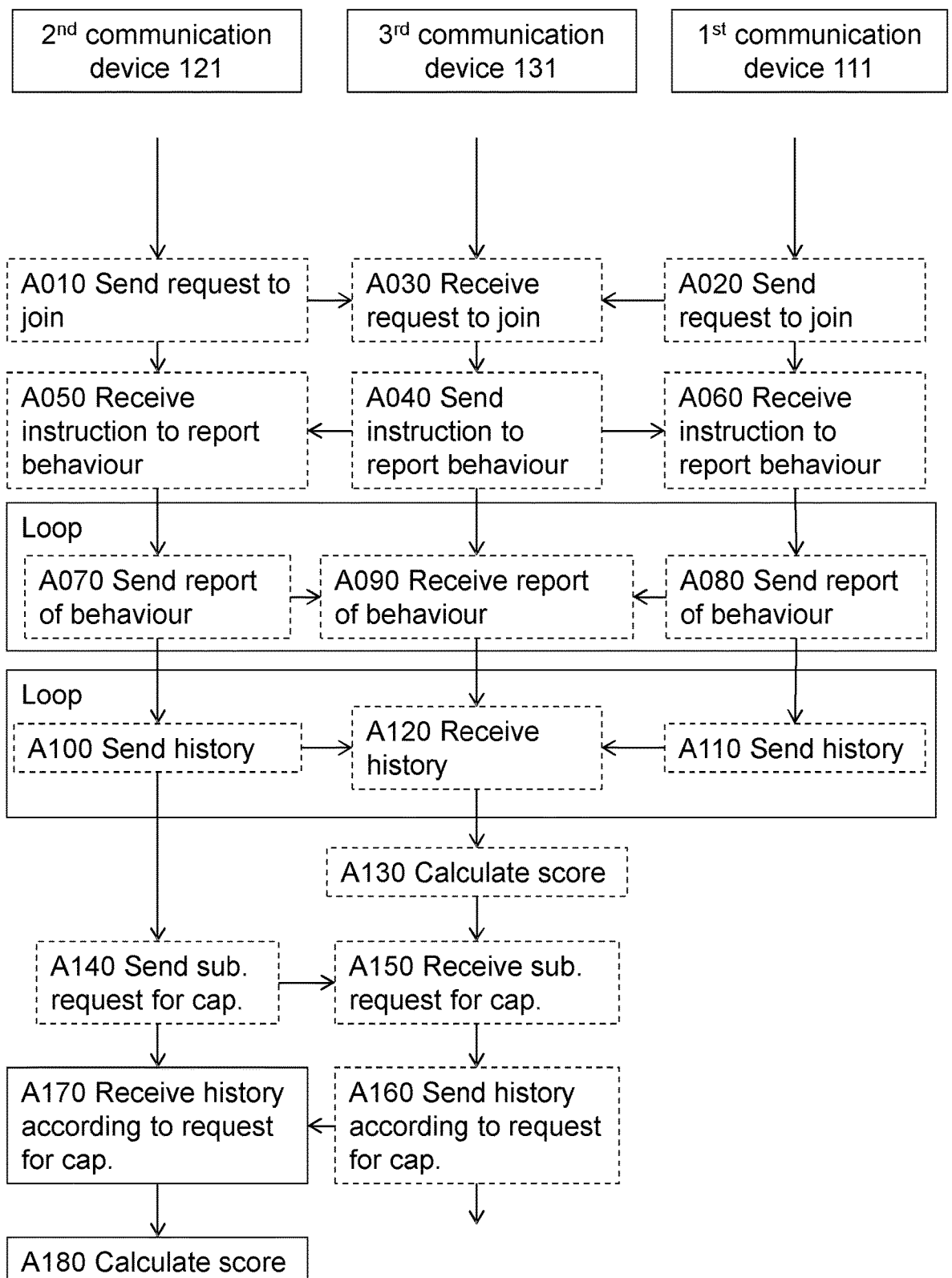
FIG. 2 is a combined signaling and flowchart illustrating embodiments of the methods herein.
Figure 3:
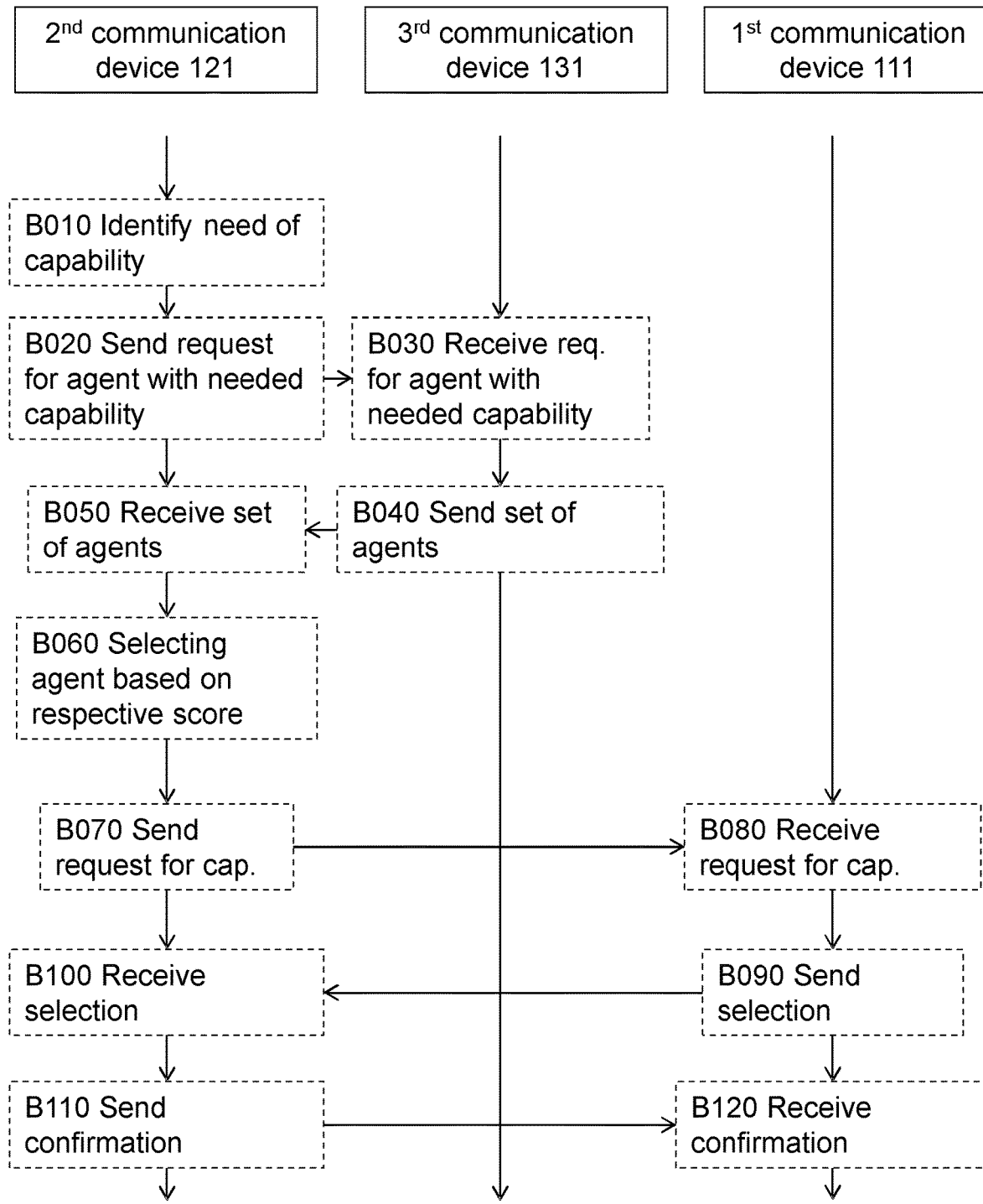
FIG. 3 is a combined signaling and flowchart illustrating further embodiments of the methods herein.

Before proceeding with the description of FIGS. 2 and 3, it shall be noted that all of, or at least one of, the actions in FIG. 2 may be performed completely or partly in parallel with all of, or at least one of, the action in FIG. 3. As an example, this means that at least one of the actions of FIG. 2 may be executed in a first thread and that at least one of the actions of FIG. 3 may be executed in a second thread, wherein the first and second threads origin from a computer program according to the embodiments herein.

As used herein, the term "capability" may refer to a service, an action, a resource or the like, that is provided and/or executed upon request.

As used herein, the term "intention" may mean that, at any given time, an agent module presents its intention as a set of actions that consume (or use) one or more capabilities, its own or that of other agent modules or a combination thereof.

As used herein, the term "policy" may refer to an invariant restriction relating to consumption, e.g. provision, of one or more capabilities when the agent module acts according to its intention in order to fulfil the request. In one example, a robot may have a policy that says it shall never get too close to another robot, i.e. a safety policy. In another example, a cloud agent needs to execute an application A at time Y, with a policy that the execution of application A does not consume more than X resources.

FIG. 2 illustrates an exemplifying method according to embodiments herein when implemented in the system 100 of FIG. 1.

As mentioned, the first and/or second communication device 121, 131 may be used to realize the embodiments herein. Hence, the term "communication device 121, 131" may sometimes be used to refer to the first and/or third communication device 121, 131.

Accordingly, the communication device 121, 131 performs a method for determining a score relating to the first agent module 110. The first agent module 110 is included in an agent community 101 managed by the agent community module 130.

When the embodiments herein are implemented in the second communication device 121, this means that the second communication device 121 performs the method for determining the score relating to the first agent module 110. The first agent module 110 is included in the agent community 101 managed by the agent community module 130, which may be executed in the third communication device 131.

When the embodiments herein are implemented in the third communication device 131, this means that the third communication device 131 performs the method for determining the score relating to the first agent module 110. The first agent module 110 is again included in the agent community 101 managed by the agent community module 130, which may again be executed by the third communication device 131 itself.

In one example, the third communication device 131 and/or the agent community module 130 may include, such as implement, be realized, execute or the like, a so called publish/subscribe server, which is a well-known server in the relevant technical field. In this context, an agent module that publishes information at the publish/subscribe server sends the information to the publish/subscribe server in order to allow the publish/subscribe server to provide the information, sent to the publish/subscribe server, to any agent module that subscribes to such information.

As mentioned, the following description assumes the embodiments herein to be implemented in the second communication device 121, except when explicitly described that the third communication device 131 implements the embodiments herein.

The capability may comprise one or more of a service, a resource and an action performable by the first agent module 110 or any other agent module.

As mentioned, the first and/or second agent module 110, 120 may comprise one or more of: a software agent module, a hardware agent module, a resource agent module, and a robot.

One or more of the following actions may be performed in any suitable order.

Action A010

In order to join the agent community 101, the second communication device 121 and/or the second agent module 120 may send a request for joining the agent community 101 to the third communication device 131 and/or the agent community module 130.

Action A020

Similarly to action A010, the first communication device 111 and/or the first agent module 110 may send a further request for joining the agent community 101 to the third communication device 131 and/or the agent community module 130. In the following, the agent community module 130 is omitted for simplicity. However, when the third communication device 131 is mentioned it shall be understood that it may instead, or in addition thereto, mean the agent community module 130.

Action A030

Subsequent to action A010 and/or A020, the third communication device 131 may receive the request and/or the further request.

Generally, whenever an agent module wishes to join the agent community 101, it needs to agree to report its behaviour, such as intention(s), policy(ies), capability(ies), according to requirements configured in the agent community module 130.

Action A040

Upon receiving the request and/or the further request, the third communication device 131 sends an instruction to report behaviour to the first and/or second communication device 111, 121. Similarly to the above, in the following, the first and/or second agent module 110, 120 are omitted for simplicity. However, when the first and/or second communication device 111, 121 is mentioned, it shall be understood that it may instead, or in addition thereto, mean the first and/or second agent module 110, 120.

One and the same instruction may thus be sent to all agents that join the agent community 101 by sending a request to the third communication device 131 and/or the agent community module 130.

Action A050

Subsequent to action A040, the second communication device 121 may receive the instruction.

Action A060

Subsequent to action A040, the first communication device 111 may receive the instruction.

Now that the first and second communication devices 111, 121 may have been instructed to report their behaviour actions A070, A080 and A090 may be performed. Actions A070, A080 and A090 may be performed repeatedly, periodically or irregularly, as a loop. However, in some cases, the first and second communication devices 111, 121 may not need to be instructed to report their behaviour, instead the first and second communication devices 111, 121 pushes their behaviour to the third communication device 131, i.e. the agent community module 130 without prior instruction.

The agent modules 110, 120, 140, 150 thus may repeatedly communicate their intentions, capabilities and policies. This information is published to the agent community module 130 as in actions A070 and/or A080.

Action A070

The second communication device 121 may send a report about its behaviour to the third communication device 131. To be explicit, the second agent module 120 may send the report to the agent community module 130, but this clarification may not be repeated for other examples below for reasons of simplicity.

In this manner, the second communication device 121 may be said to report its own behaviour, which may mean that information about a capability of the second agent module 120, information about an intention of the second agent module 120, information about a policy for the capability of the second agent module 120, and a time stamp may be reported to the third communication device 131.

Expressed differently, the communication device 121, 131 may publish the information about the capability of the second agent module 120, the information about the intention of the second agent module 120, the information about the policy for the capability of the second agent module 120, and the time stamp e.g. relating to the publishing.

Action A080

The first communication device 111 may send a further report about its behaviour to the third communication device 131.

Action A090

Subsequent to one or more of actions A070 and A080, the third communication device 131 may receive the report and the further report from the second and first communication devices 121, 111, respectively.

In view of actions A070 through A090, it may be noted that the report may include information about a capability, an intention and a policy for an agent module that sends the report, e.g. the first and second communication devices 111, 121. The capability, the intention and the policy will be explain in more detail below.

Above, the instruction of action A040 is directed towards reporting of own behaviour. However, in addition or alternatively, the instruction may be directed towards reporting of information relating to requests, performed by any further agent module 140, 150, for consumption of a capability of another agent module, such as the first agent module 110. Since the information is related to requests performed by said any further agent module, the information may be said to include history of requests, or historical outcome of requests.

Action A100

Hence, the second communication device 121 may send history, e.g. information relating to a request performed by the second communication device 121. In this manner, the second communication device 121 may be said to report history of its own requests for consumption of a capability.

Expressed differently, the communication device 121, 131 may publish information about a capability of said further agent module 140, 150, information about an intention of said further agent module 140, 150, information about a policy for the capability of said further agent module 140, 150, and a time stamp relating to the publishing.

Action A110

Similarly, the first communication device 111 may send history, e.g. information relating to a further request performed by the first communication device 111.

Action A120

Subsequent to action A100 and/or A110, the third communication device 131 may receive history for one or more requests performed by the first and/or second communication device 111, 121.

Also these actions, i.e. action A100-A120, may be performed repeatedly, periodically or irregularly, as a loop. However, in some cases, the first and second communication devices 111, 121 may not need to be instructed to report history of requests, instead the first and second communication devices 111, 121 pushes their history to the third communication device 131, i.e. the agent community module 130 without prior instruction.

Action A130

This action is performed when the embodiments herein are implemented in the third communication device 131 and/or the agent community module 130. Hence, when action A090 and A120 have been performed, the third communication device 131 may calculate a respective score for each capability and each agent module, such as the first and second agent modules 110, 120, that has joined the agent community 101. The calculation of the score is described in more detail below.

In the following, the description continues with reference to the case when the embodiments are implemented in the second communication device 121.

Action A140

In order to prepare the second communication device 121, in case a need for a certain capability arise, the second communication device 121 may send a subscription request for capability, i.e. a subscription request for the certain capability. The subscription request may typically be sent to the agent community module 130 and/or the third communication device 131.

Action A150

Subsequent to action A140, the third communication device 131 may receive the subscription request for capability. Since the third communication device 131 may have received reports of behaviour as well as history, the third communication device 131 is able to determine which of the agents in the community 101 that has the requested capability.

Action A160

Upon managing the subscription request for capability, the third communication device 131 sends information relating to at least one request, performed by any further agent module 140, 150, for consumption of the capability of the first agent module 110. Said any further agent module 140, 150 is included in the agent community 101.

The information relating to the performed request includes information about the capability of the first agent module 110, information about an intention of the first agent module 110, wherein the intention specifies a set of actions that consumes the capability in order to fulfil the request, and information about a policy for the capability, wherein the policy restricts, in terms of one or more of time, space, speed and hardware used by the first agent module 110, consumption of the capability when the first agent module 110 acts according to its intention in order to fulfil the request.

In this manner, the third communication device 131 informs the second communication device 121 about history of performed requests with respect to the first communication device 111.

Action A170

Consequently, the second communication device 121 receives the information relating to said at least one request, performed by said any further agent module 140, 150, for consumption of the capability of the first agent module 110.

Now that the second communication device 121 is made aware of the history of performed requests with respect to the first communication device 111, the second communication device 121 is able to calculate a score in the relation to the first agent module 110 as in action A180 below.

Action A180

Thus, the communication device 121 calculates the score in relation to the first agent module 110 based on the information relating to the performed request, wherein the score further is specified with respect to the capability.

The reported behaviour together with the observed history of other agent modules may thus be used for calculating the score, such as a trust, trust level or the like, between agent modules. The calculated trust may subsequently be used when choosing to whom an agent module will provision its capability.

In view of FIG. 2, there is provided a method for building a trust model, such as a way to calculate the score, in a collaborative network of agent modules.

Agent modules share the same or similar communication protocol, i.e. each agent is communicating information about their intentions, e.g. plan, schedule, goals and states, etc., capabilities, e.g. hardware resources, services it can provide, actions it can perform, etc., and policies. It may be that the agent modules of the agent community 101 have synchronized clocks, and that time evolves with same pace in the agent modules.

The communication protocol between the agent modules may be realized in different ways for e.g. by using a publish/subscribe pattern, such as using data distribution service (DDS) middleware, a publish/subtribe server or the like.

In this way, it is assumed that the agent modules can communicate with each other. Agent modules are capable of finding one or more agents, which for a given interoperability scenario.

In one embodiment, the agent modules may share a holistic and abstracted view of the capabilities, such as resources, services or actions, of each agent module. Other agent modules utilize such holistic and abstracted view, such as a catalogue, to identify matching requested capabilities, intentions and policies and agent modules that can provide these capabilities given the request intentions and policies. A technology to use for this can be based on the Semantic Web that provides a way to add "meaning and relatedness" to objects on the Web. As such, in the multi-agent system, one needs to define an ontology of capabilities for normalizing meaning across terminology or properties. One possible implementation format is using Resource Description Framework (RDF) techniques, e.g. the inter-cloud ontology defined in "Towards an Ontology-Based Intercloud Resource Catalogue—The IEEE P2302 Intercloud Approach for a Semantic Resource Exchange", to B. Di Martino et al., IEEE International Conference on Cloud Engineering (IC2E), April 2015. Another possible approach could be the application of "language games" among agents, as in "Learning Language Games through Interaction", to Wang, Sida I., Percy Liang, and Christopher D. Manning, in arXiv Preprint arXiv:1606.02447, 2016. https://arxiv.org/abs/1606.02447, which consists on making the agents interact with each other exchanging messages about their world views, intentions and capabilities. Based on that exchange, the agent modules may come up with a mapping between their ways of referring to things. Other standards for semantic interoperability and interface standardization, such as hypercat (http://www.hypercat.io/) or IPSO (www.ipso-alliance.org), could also be used for establishing a lingua franca among agent modules.

Calculation of Score

In the following an exemplifying way of calculating the score is described. The score may be computed as a function of history observations vs. intentions, capabilities and policies. For example, Agent1 publishes the observable history of all the agents except itself, i.e., Agent2, Agent3 . . . Agentn.

Based on our previous definition of trust, we have defined the trust level of agent i on agent j's capabilities c as:

$$T_{ijc}=f(I,P,C,H,t)$$

where:
- I: are the intentions declared by agent j, i.e. current goals and plans; the plans can be for example a sequence of actions which are executed using a certain capability of the agent. For example, a robot may execute a plan using its capability to move and lift packages. A cloud agent may have an intention to perform computation, and it can report its computation schedule.
- P: are policies applied to the intentions declared by agent j. They constrain behaviours. For example, a robot agent would not make any move if it is within a certain distance of another robot agent; the policy for an edge cloud would be to provide responses within a certain time.
- C: is the set of capabilities declared by agent j, e.g. processing power, skills, services, etc. For example, an edge cloud may offer a service (i.e. have a capability) for aggregating and computing data coming from Iot devices.
- H: is the history of decisions made by agent j according to previous intentions and what agent j actually did, as observed by agent i or as informed by a trusted authority; For example, the history of an edge cloud agent could report how (seen by others) that agent has performed the aggregation and computation service with respect to its policies, e.g. did it respond on time and did it really provide results as specified in the service. Or an edge cloud agent could report how the other agent has consumed the capability, e.g. did it over-consume a resource or did it consume a resource different from its claimed intentions.
- t: is the current time, e.g. as synchronized among all agent modules in the agent community 101.

Agent1 will trust Agent2 based on a function of the above over a time period. Each agent may compute this in a different way depending on what is important to it. For example, it may be important to compute only for a small part of the recent past time, or it may be useful only to compute with respect to a given capability of a set of capabilities or some intentions, in a given situation. Typically, the score by one agent module towards another would be on a scale of −1 to 1. In the case when it didn't have enough information, trust level would be zero, which would mean that it neither trusted nor distrusted the other agent.

With reference to FIG. 3, it is described how an agent module, e.g. included in the second communication device 121, may use the calculated score to determine with which agent module to interact with, or whether or not to accept a request for consumption of a capability from an agent module. Thus, FIG. 3 illustrates further exemplifying methods according to embodiments herein when implemented in the system 100 of FIG. 1.

One or more of the following actions may be performed in any suitable order.

Action B010

The second communication device 121 may identify a need for a particular capability.

Action B020

Thus, the second communication device 121 may send, to the agent community module 130, a request for a set of agent modules having the particular capability, Action B030

Subsequent to action B020, the third communication device 131 may receive the request for the agent modules having the particular capability.

Action B040

Thanks to that, as described above with reference to FIG. 2, agent modules report their behaviour to the third communication device 131, the third communication device 131 is able to identify which agent modules that have the particular capability. Then, the third communication device 131 may send a set of agent modules with the particular capability to the second communication device 121. In fact, it is rather the case that a set of indications of the set of agent modules having the particular capability is sent to the second communication device 121.

Action B050

Subsequent to action B040, the communication device 121, 131 may receive, from the agent community module 130, the set of agent modules, i.e. the set of indication of the set of agent modules as explained above.

Action B060

The second communication device 121 may select, from among the set of agent modules, a particular agent module for interaction with the second agent module 120, wherein the particular agent module is selected based on a respective score for each of the agent modules of the set. The respective score may have been calculated as described above. A set of respective score may comprise each respective score for all agent modules.

As an example, the second communication device 121 may select the agent module for which the respective score is the highest, or among the highest, of the set of respective scores.

As another example, the second communication device 121 may select any agent module for which the respective score is above a threshold value for acceptable score.

Action B070

The second communication device 121 may send a request for consumption of the particular capability to the agent module selected in action B060, which may be included in the first communication device 111.

Action B080

Subsequent to action B070, the first communication device 111 may receive the request.

Action B090

The first communication device 111 may confirm back to the second communication device 121 that it will provide the requested capability, e.g. by sending a indication about the selected agent module. This may be performed after the first communication device 111 has checked that the score towards the second communication device 121 is acceptable.

Action B100

Subsequent to action B090, the second communication device 121 may receive the indication about the selected agent module.

Action B110

The second communication device 121 may send, to the first communication device 111, a confirmation that the capability shall be provided by the first communication device 111 for consumption by the second communication device 121.

Action B120

Subsequent to action B110, the first communication device 111 may receive the confirmation.

Example Implementation of a Communication Protocol Between the Agent Modules

The following non-limiting implementation uses Representation state transfer (REST)ful Hyper Text Transfer Protocol (HTTP) sessions and JavaScript Object Notation (JSON) schema and an HTTP pub/sub server.

As mentioned above, the agent modules may send HTTP post messages. In structure 1, an exemplifying HTTP post message is shown. The exemplifying HTTP post message may originate from a cloud agent module, which presents its intentions, capabilities, policies and timestamp. In the intentions, the agent module reports its computational schedule i.e. plan for a given time period. The policy is to have a delay less 20 s, and the capability describes two types of capabilities i.e. what kind of resources the agent can provide and what kind of services it can offer.

```
{
    "AgentID": 17,
    "AgentName": "EdgeCloud_1",
    "Intention":
        [
                    {"computational state schedule":
                        {
                            "cpu":"10Core",
                            "mem":"2G"
                            "nw":"100Mps"
                            "period":" 467393984949-467393985145"
                        }
                    ...
                        {
                            "cpu":"12Core",
                            "mem":"2.5G"
                            "nw":"100Mps"
                            "period":" 467393998111-467393999999"
                        }
                    }
        ]
    "Policy":
        [
                        {
                            "type":"delay threshold"
                            "value":"20s"
                        },
                        {
                            "type":"distance threshold"
                            "value":"5km"
                        }
        ],
    "Capability":
        [
                        {
                            "type":"resource"
                            "typeValue":"GPU"
                            "value":"200G"
                        },
                        {
                            "type":"service"
                            "typeValue":"graphic gaming"
                            "value":"20 users"
                        }
        ],
    "time": "467393984949"
}
```
Structure 1 above: HTTP post message from a cloud agent In Structure 2 below, a further exemplifying HTTP post message is illustrated. The HTTP post message may originate from a robot, which presents its intentions, capabilities, policies and timestamp. In the intentions, the robot reports its action plan for a given time period. The policy is to always hold a distance from other robots at least 15 cm, and the capability describes the types of actions the robot can perform, that can be used when collaborating with other robots.

```
{
  "AgentID": 31,
  "AgentName": "RobotAgent_3",
  "Intention":
    [
        {"action plan":
            {
                    "action":"move(a,b)"
                    "period":" 467393977777-467393977827"
            }
            {
                    "action":"pickup(package12,b)"
                    "period":" 467393977830-467393977834"
            }
            {
                    "action":"move(b,c)"
                    "period":" 467393977836-467393977880"
            }
            {
                    "action":"drop(package12,c)"
                    "period":" 467393977885-467393977888"
            }
    ],
    "Policy":
    [
            {
                    "type":"distance threshold"
                    "value":"15cm"
            }
    ],
    "Capability":
    [
            {
                    "type":"action"
                    "typeValue":"move_action"
                    "value":" move(loc0, loc1)
            },
            {
                    "type":"action"
                    "typeValue":"pickup"
                    "value":"pickup(object, loc)"
            }polo
            {
                    "type":"action"
                    "typeValue":"drop_action"
                    "value":"drop(object, loc)"
            }
    ],
    "time": "467393977777"
}
```
Structure 2: HTTP post message from an agent module, such a robot.

Furthermore, e.g. with reference to actions A100 and/or A110, the history may be published to the agent community module according to Structure 3 below.

```
"History":
"ObservedAgentID": 31,
"ObservedAgentName": "RobotAgent_3",
    {"action plan observation": [
            {
                    "action":"move(a,b)"
                    "period":" 467393977800"
            },
            {
                    "action":"pickup(package12,b)"
                    "period":" 467393977835"
            },
            {
                    "action":"move(b,c)"
                    "period":" 467393977875"
            },
            {
                    "action":"drop(package12,c)"
                    "period":" 467393977890"
            }]
    "Intent_Id": "Movement_Plan_09812747748578"
}
```
Structure 3 above: Another exemplifying HTTP post message.

According to the embodiments herein, there is proposed a method for dynamic trust-based, i.e. dependent on the score, collaborative resource/service/action provisioning based on a communication protocol in which the agent modules agree to share their capabilities, intentions and policies. As mentioned before, resource/service/action is sometimes referred to as capability herein. The trust, i.e. the score, is calculated as a function of published history of a given agent module's capability as seen from other agent modules. This method increases the trustfulness and capability sharing in the agent community 101.

Thanks to the embodiments of the methods proposed herein, primarily as shown in FIG. 2, a method for collaboratively publishing agent modules' capabilities, intentions and policies and publishing history observations seen by other agent modules with respect to the capabilities, intentions and policies is provided. The history observations thus relate to outcome of requests for consumption of a capability from an agent module. This agent module then publishes the outcome to the agent community module. In this manner, the basis on which the score is dynamically, e.g. more or less continuously updated, such that the respective scores for one or more agent modules with respect to one or more capabilities thereof may also be dynamically updated. Hence, there may often be a recently calculated score to be used at any time when required due to a request for consumption of a particular capability.

Furthermore, as illustrated with reference to FIG. 3 above, there is provided a method for using the calculated score in deciding whether a given agent module will serve another agent module, i.e. for providing the requested capability, and on which agent module another agent module will request the capability to be performed.

It shall be noted, as described above, that the score is calculated based on a combination of: C, P, and I. In particular, this means that the score is calculated with respect to a certain capability, rather than an agent as a whole, while the agent modules intentions and policies with respect to the certain capability is taken into account.

Moreover, it shall be noted that the score is derived by comparing an agent modules capability, intention and policy versus history of the agent module with respect to these measures.

An advantage may be, at least for some embodiments, that accuracy of scores, e.g. relating to a trust level, is improved thanks to that history of past requests for consumption of a capability in combination with intention and policy for that capability is taken into account when calculating the score. For example, the score may thus include information about whether or not a particular agent module may or may not keep its promises with respect to provisioning of the capability, e.g. by not over consuming a resource, such as memory, processing power, spatial allowance or the like.

A further advantage may be, at least for some embodiments, that the calculation of the score is automatic in that no manual intervention is required.

A still further advantage may be, at least for some embodiments, that the methods herein provide an easy way of identifying a non-trusted agent in the agent community e.g. by means of evaluating the score in relation to a threshold value. A score below the threshold value may cause an agent module to be excluded from the agent community. Accordingly, agent modules may avoid interaction with untrusted agent modules, i.e. those agent modules having a score less than the threshold value.

Figure 4:
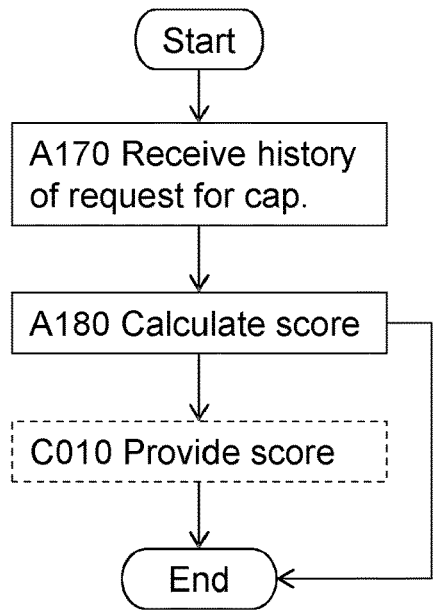
FIG. 4 is a flowchart illustrating embodiments of the method in the communication device.
Figure 5:
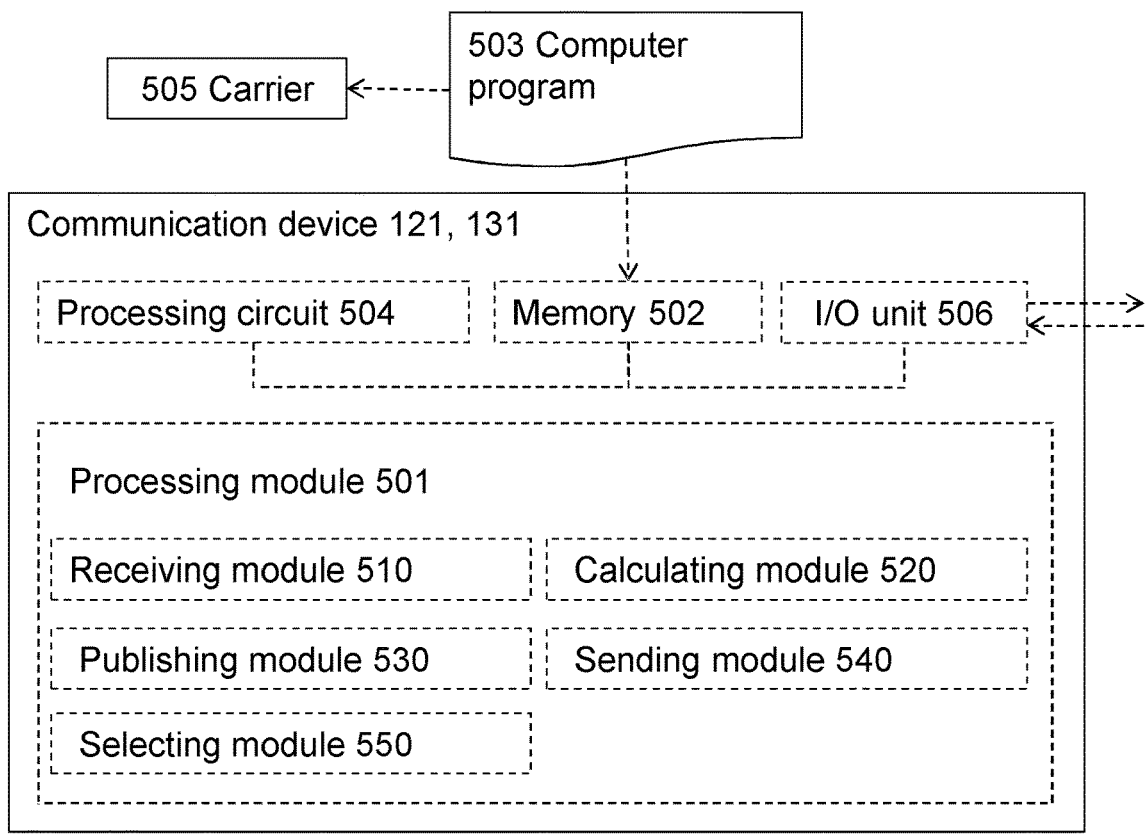
FIG. 5 is a block diagram illustrating embodiments of the communication device.

With reference to FIGS. 4 and 5, it shall be noted that the term "communication device" is used to refer to the second communication device 121 and/or the third communication device 131.

In FIG. 4, a schematic flowchart of exemplifying methods in the communication device 121, 132 is shown. Again, the same reference numerals as above have been used to denote the same or similar features, in particular the same reference numerals have been used to denote the same or similar actions. Accordingly, the communication device 121, 131 performs a method for determining a score relating to a first agent module 110. As mentioned, the first agent module 110 is included in an agent community 101 managed by an agent community module 130.

The first and/or second agent module 110, 120 may comprise one or more of: a software agent module, a hardware agent module, a resource agent module, and a robot.

In this flowchart some of the actions of FIGS. 2 and 3 above may have been omitted for reasons of simplicity.

One or more of the following actions may be performed in any suitable order.

Action A170

The communication device 121, 131 receives information relating to at least one request, performed by any further agent module 140, 150, for consumption of a capability of the first agent module 110, wherein said any further agent module 140, 150 is included in the agent community 101.

The information relating to the performed request includes:
information about the capability of the first agent module 110,
information about an intention of the first agent module 110, wherein the intention specifies a set of actions that consumes the capability in order to fulfil the request, and
information about a policy for the capability, wherein the policy restricts, in terms of one or more of time, space, speed and hardware used by the first agent module 110, consumption of the capability when the first agent module 110 acts according to its intention in order to fulfil the request.

The capability may comprise one or more of a service, a resource and an action performable by the first agent module 110.

Action A180

The communication device 121, 131 calculates the score in relation to the first agent module 110 based on the information relating to the performed request, wherein the score further is specified with respect to the capability.

Action C010

The communication device 121, 131 may provide the score, e.g. upon reception of a request for the score to be provided, such as sent to the requester. Alternatively or additionally, the communication device 121, 131 may periodically, or irregularly, provide the score to any interested party, such as all agent modules in the agent community 101.

With reference to FIG. 5, a schematic block diagram of embodiments of the communication device 121, 131 is shown.

The communication device 121, 131 may comprise a processing module 501, such as a means for performing the methods described herein. The means may be embodied in the form of one or more hardware modules and/or one or more software modules The communication device 121, 131 may further comprise a memory 502. The memory may comprise, such as contain or store, instructions, e.g. in the form of a computer program 503, which may comprise computer readable code units.

According to some embodiments herein, the communication device 121, 131 and/or the processing module 501 comprises a processing circuit 504 as an exemplifying hardware module, which may comprise one or more processors. Accordingly, the processing module 501 may be embodied in the form of, or 'realized by', the processing circuit 504. The instructions may be executable by the processing circuit 504, whereby the communication device 121, 131 is operative to perform the methods of FIGS. 2, 3 and/or 4. As another example, the instructions, when executed by the communication device 121, 131 and/or the processing circuit 504, may cause the communication device 121, 131 to perform the method according to FIGS. 2, 3 and/or 4.

In view of the above, in one example, there is provided a communication device 121, 131 for determining a score relating to a first agent module 110. Again, the memory 502 contains the instructions executable by said processing circuit 504 whereby the communication device 121, 131 is operative for:

receiving information relating to at least one request, performed by any further agent module 140, 150, for consumption of a capability of the first agent module 110, wherein said any further agent module 140, 150 is included in the agent community 101, wherein the information relating to the performed request includes:
information about the capability of the first agent module 110,
information about an intention of the first agent module 110, wherein the intention specifies a set of actions that consumes the capability in order to fulfil the request, and
information about a policy for the capability, wherein the policy restricts, in terms of one or more of time, space, speed and hardware used by the first agent module 110, consumption of the capability when the first agent module 110 acts according to its intention in order to fulfil the request, and
calculating the score in relation to the first agent module 110 based on the information relating to the performed request, wherein the score further is specified with respect to the capability.

FIG. 5 further illustrates a carrier 505, or computer program carrier, which comprises the computer program 503 as described directly above.

In some embodiments, the communication device 121, 131 and/or the processing module 501 may comprise one or more of a receiving module 510, a calculating module 520, a publishing module 530, a sending module 540, and a selecting module 550 as exemplifying hardware modules. In other examples, one or more of the aforementioned exemplifying hardware modules may be implemented as one or more software modules.

Moreover, the communication device 121, 131 and/or the processing module 501 comprises an Input/Output unit 506, which may be exemplified by the receiving module and/or the sending module when applicable.

Accordingly, the communication device 121, 131 is configured for determining a score relating to a first agent module 110. As mentioned, the first agent module 110 is included in an agent community 101 managed by an agent community module 130.

Therefore, according to the various embodiments described above, the communication device 121, 131 and/or the processing module 501 and/or the receiving module 510 is configured for receiving information relating to at least one request, performed by any further agent module 140, 150 for consumption of a capability of the first agent module 110. Said any further agent module 140, 150 is included in the agent community 101. The capability may comprise one or more of a service, a resource and an action performable by the first agent module 110.

As mentioned, the information relating to the performed request includes: information about the capability of the first agent module 110, information about an intention of the first agent module 110, wherein the intention specifies a set of actions that consumes the capability in order to fulfil the request, and information about a policy for the capability, wherein the policy restricts, in terms of one or more of time, space, speed and hardware used by the first agent module 110, consumption of the capability when the first agent module 110 acts according to its intention in order to fulfil the request.

Moreover, the communication device 121, 131 and/or the processing module 501 and/or the calculating module 520 is configured for calculating the score in relation to the first agent module 110 based on the information relating to the performed request. The score further is specified with respect to the capability.

The communication device 121, 131 and/or the processing module 501 and/or the publishing module 530 may be configured for publishing information about a capability of the second agent module 120, information about an intention of the second agent module 120, information about a policy applied to the intention of the second agent module 120, a time stamp relating to the publishing.

The communication device 121, 131 and/or the processing module 501 and/or the publishing module 530, or a further publishing module (not shown), may be configured for publishing information about a capability of said further agent module 140, 150, information about an intention of said further agent module 140, 150, information about a policy applied to the intention of said further agent module 140, 150, a time stamp relating to the publishing.

The communication device 121, 131 and/or the processing module 501 and/or the sending module 540 may be configured for sending, to an agent community module 130, a request for a set of agent modules having a particular capability, receiving, from the agent community module 130, the set of agent modules.

Furthermore, the communication device 121, 131 and/or the processing module 501 and/or the selecting module 550 may be configured for selecting, from among the set of agent modules, a particular agent module for interaction with the second agent module 120, wherein the particular agent module is selected based on a respective score for each of the agent modules of the set.

As used herein, the term "communication device", may refer to a single physical entity or one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method performed by a communication device for determining a score relating to a first agent module, wherein the first agent module is included in an agent community managed by an agent community module, wherein the method comprises:
   receiving information relating to at least one request, performed by another agent module separate from the first agent module, for consumption of a capability of the first agent module, wherein the another agent module is included in the agent community, wherein the information relating to the at least one request includes:
      information about the capability of the first agent module, wherein the capability is a service or an action,
      information about an intention of the first agent module, wherein the intention specifies a set of actions that uses the capability in order to fulfil the request, and
      information about a policy for the capability, wherein the policy restricts, in terms of one or more of time, space, speed, and hardware used by the first agent module, for use of the capability when the first agent module acts according to its intention in order to fulfil the at least one request, and calculating the score in relation to the first agent module based on the information relating to the at least one request, wherein the score further is specified with respect to the capability.

2. The method according to claim 1, wherein the communication device comprises a second agent module, wherein the method further comprises:
   publishing information about a capability of the second agent module, information about an intention of the second agent module, information about a policy for the capability of the second agent module, and a time stamp relating to the publishing.

3. The method according to claim 1, wherein the method further comprises:
   publishing information about a capability of the another agent module, information about an intention of the another agent module, information about a policy for the capability of the another agent module, and a time stamp relating to the publishing of the information in relation to the another agent module.

4. The method according to claim 1, wherein the method further comprises:
   sending, to the agent community module, a request for a set of agent modules having a particular capability,
   receiving, from the agent community module, the set of agent modules, and
   selecting, from among the set of agent modules, a particular agent module for interaction with a second agent module, wherein the particular agent module is selected based on a respective score for each of the agent modules of the set of agent modules.

5. The method according to claim 1, wherein the capability comprises one or more of a service, a resource, and an action performable by the first agent module.

6. The method of claim 1, wherein the method further comprises:
   receiving, from a set of communication devices, a score request that requests the score; and
   providing the score to the set of communication devices in response to the score request.

7. A communication device configured for determining a score relating to a first agent module, wherein the first agent module is included in an agent community managed by an agent community module, wherein the communication device is configured for:
   receiving information relating to at least one request, performed by another agent module separate from the first agent module, for consumption of a capability of the first agent module, wherein the another agent module is included in the agent community, wherein the information relating to the at least one request includes:
      information about the capability of the first agent module, wherein the capability is a service or an action,
      information about an intention of the first agent module, wherein the intention specifies a set of actions that uses the capability in order to fulfil the request, and
      information about a policy for the capability, wherein the policy restricts, in terms of one or more of time, space, speed and hardware used by the first agent module, for use of the capability when the first agent module acts according to its intention in order to fulfil the at least one request, and calculating the score in relation to the first agent module based on the information relating to the at least one request, wherein the score further is specified with respect to the capability.

8. The communication device according to claim 7, wherein the communication device is further configured for publishing information about a capability of a second agent module, information about an intention of the second agent module, information about a policy applied to the intention of the second agent module, a time stamp relating to the publishing.

9. The communication device according to claim 7, wherein the communication device is further configured for publishing information about a capability of the another agent module, information about an intention of the another agent module, information about a policy applied to the intention of the another agent module, a time stamp relating to the publishing of the information in relation to the another agent module.

10. The communication device according to claim 7, wherein the communication device is further configured for sending, to the agent community module, a request for a set of agent modules having a particular capability, receiving, from the agent community module, the set of agent modules, and selecting, from among the set of agent modules, a particular agent module for interaction with a second agent module, wherein the particular agent module is selected based on a respective score for each of the agent modules of the set of agent modules.

11. The communication device according to claim 7, wherein the capability comprises one or more of a service, a resource, and an action performable by the first agent module.

12. The communication device of claim 7, wherein the communication device is further configured for:
receiving, from a set of communication devices, a score request that requests the score; and
providing the score to the set of communication devices in response to the score request.

13. A non-transitory machine-readable storage medium that provides instructions that, if executed by a processor of a communication device, will cause the processor to perform operations for determining a score relating to a first agent module, wherein the first agent module is included in an agent community managed by an agent community module, wherein the operations comprise:
receiving information relating to at least one request, performed by another agent module separate from the first agent module, for consumption of a capability of the first agent module, wherein the another agent module is included in the agent community, wherein the information relating to the at least one request includes:
information about the capability of the first agent module, wherein the capability is a service or an action,
information about an intention of the first agent module, wherein the intention specifies a set of actions that uses the capability in order to fulfil the request, and
information about a policy for the capability, wherein the policy restricts, in terms of one or more of time, space, speed, and hardware used by the first agent module, for use of the capability when the first agent module acts according to its intention in order to fulfil the at least one request; and
calculating the score in relation to the first agent module based on the information relating to the at least one request, wherein the score further is specified with respect to the capability.

14. The non-transitory machine-readable storage medium according to claim 13, wherein the communication device comprises a second agent module, wherein the operations further comprise:
publishing information about a capability of the second agent module, information about an intention of the second agent module, information about a policy for the capability of the second agent module, and a time stamp relating to the publishing.

15. The non-transitory machine-readable storage medium according to claim 13, wherein the operations further comprise:
publishing information about a capability of the another agent module, information about an intention of the another agent module, information about a policy for the capability of the another agent module, and a time stamp relating to the publishing of the information in relation to the another agent module.

16. The non-transitory machine-readable storage medium according to claim 13, wherein the operations further comprise:
sending, to the agent community module, a request for a set of agent modules having a particular capability;
receiving, from the agent community module, the set of agent modules; and
selecting, from among the set of agent modules, a particular agent module for interaction with a second agent module, wherein the particular agent module is selected based on a respective score for each of the agent modules of the set of agent modules.

17. The non-transitory machine-readable storage medium according to claim 13, wherein the capability comprises one or more of a service, a resource, and an action performable by the first agent module.

18. The non-transitory machine-readable storage medium according to claim 13, wherein the operations further comprise:
receiving, from a set of communication devices, a score request that requests the score; and
providing the score to the set of communication devices in response to the score request.

* * * * *